March 24, 1964 A. A. KNOX 3,126,163

ENDLESS RECORDER TAPE CARTRIDGE

Filed Jan. 13, 1961 2 Sheets-Sheet 1

AUSTIN A. KNOX
*INVENTOR*

BY Mason, Porter, Miller & Stewart

*ATTORNEYS*

ENDLESS RECORDER TAPE CARTRIDGE

Filed Jan. 13, 1961

2 Sheets-Sheet 2

AUSTIN A. KNOX
*INVENTOR*

BY Mason, Porter, Miller & Stewart

ATTORNEYS

United States Patent Office 3,126,163
Patented Mar. 24, 1964

3,126,163
ENDLESS RECORDER TAPE CARTRIDGE

Austin A. Knox, Kensington, Md., assignor to Audio Devices, Inc., New York, N.Y., a corporation of New York Filed Jan. 13, 1961, Ser. No. 82,425
3 Claims. (Cl. 242—55.19)

This invention relates to an endless tape magazine package or cartridge particularly adapted for use with magnetic recording and reproducing apparatus. While the magazine is particularly adapted for transducer use it will be apparent that it is adapted for use with other types of recording and reproducing apparatus other than magnetic.

It is an object of the invention to provide a two-part, compact magazine or cartridge of non-metallic construction wherein the two portions thereof each have built-in connector or latching and positioning elements which align and rigidly secure the magazine casing sections together in sealing relation but which are capable of being easily detached from each for separation of the casing sections when replacement or inspection of the magazine contents is necessary or desired.

Another object of the invention is to provide a transducer tape magazine containing an endless flat tape, which is adapted for use with magnetic recording and reproducing devices, the magazine containing a single tape spool on which the tape is spirally coiled and onto and off of which the endless tape is fed, the tape having an open loop portion in the plane of the coil on the spool that is adapted to be engaged by the tape driving and transducer head means of the recording and reproducing apparatus with which the tape magazine is to be used.

Another object is to provide a recording and reproducing two-part tape magazine containing an endless tape spirally wound on a single spool having a single flange and to and from which an open loop of the endless tape is fed and guided by integrally formed guiding elements in the two portions of the magazine.

Another object is to provide a tape magazine containing a novel two-part tape spool construction having a single flange and wherein the reel portion of the spool is so constructed as to effect automatic alignment of the tape convolutions on the reel of the spool structure and in close contact with the spool flange.

Another object is to provide a magazine for a transducer tape including a novel tape holding and tensioning means.

Another object of the invention is to provide a tape magazine that is low in manufacturing costs, light in weight, compact, rigid and of non-magnetic material and sufficiently strong to withstand rough handling without damage.

The foregoing and other objects of the invention will be understood from the following description which, taken in connection with the accompanying drawings, disclose the preferred embodiment thereof.

Referring to the drawings.

As illustrated, the tape magazine, package or cartridge is designated generally at 10 in FIG. 3 and comprises a major casing or bottom portion 11, hereinafter referred to as the casing and a complementary cover portion 12 snugly engaging casing 11. These magazine portions are preferably, but not necessarily, constructed of a suitable plastic material of suitable wall thickness consistent with appropriate wall strength and lightness and may be transparent or opaque as desired.

Figure 1:
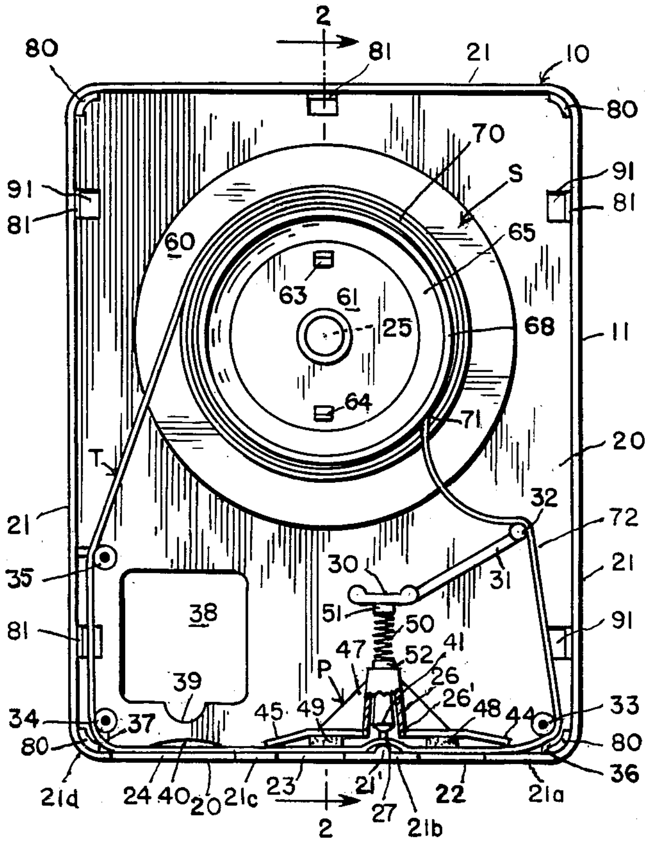
FIG. 1 is a plan view of the tape magazine with the cover member removed.
Figure 2:
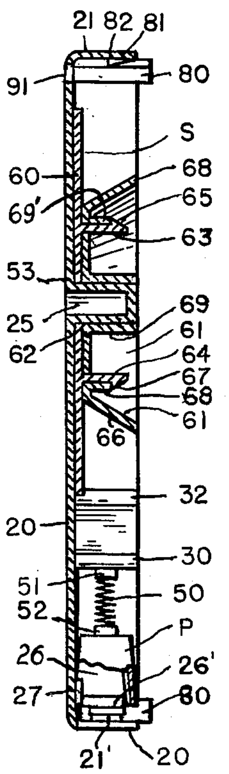
FIG. 2 is a vertical sectional view of the magazine taken on line 2—2 of FIG. 1.
Figure 3:
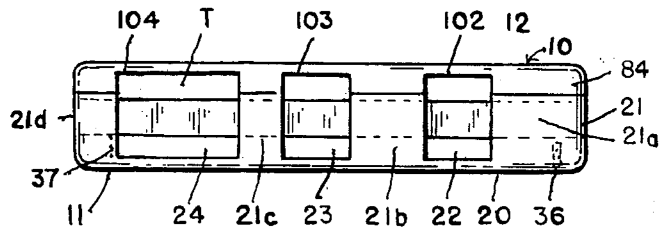
FIG. 3 is a front view of the magazine.

Noting FIGS. 1 to 3, the casing 11 comprises a bottom flat wall 20 from which extends a peripheral side wall 21 normal thereto of uniform height about its periphery, its top edge being parallel to bottom wall 20. Wall 21 at the front side (FIGS. 1 and 3) of the magazine is provided with three spaced, preferably rectangular apertures 22, 23 and 24 dividing the wall into narrow sections, section 21*a* lying to the right of aperture 22, section 21*b* extending between apertures 22 and 23, section 21*c* extending between apertures 23 and 24, while section 21*d* is disposed to the left of aperture 24. Aperture 24 is preferably of a length greater than apertures 22 and 23, which are both of the same length. Apertures 22 and 23 which are provided for the transducer head (not shown) are adapted to extend a slight distance therein in operative relation to the tape T, while aperture 24 is provided for association with the tape driving means, as hereinafter more fully explained. The cover 12 has portions cooperating to complete apertures 22—24 as explained later on.

As shown in FIG. 2, an integral hollow lug 25, formed in the bottom wall of the casing 11 extending normal thereto and the same height as peripheral wall 21, forms a spindle for a composite tape spool structure S. The spool S, as indicated in FIG. 1, is located medially of two sides of the casing 11 and in the back portion thereof relatively remote with respect to apertures 22—24.

Spaced to provide tape passage clearance behind the casing front side wall section 21*b*, is a guide lug 26 integral with the casing bottom and which freely and slidably receives a frictional holding and tape tensioning member P. The lower portion of guide lug 26 is integrally connected to peripheral wall portion 21 of the casing by a tape-guiding web 27. The casing wall portion 21*b* and lug 26 have tensioning ribs or tape-guiding surfaces 21′ and 26′, respectively, located abreast of each other as shown in FIGS. 1 and 2. Spaced a suitable distance behind guide lug 26 is a spring abutment 30 likewise integral with casing 11. Connected thereto, as indicated in FIG. 1, by means of a reinforcing web 31 is a tape-guiding lug or post 32, located rearwardly from and outwardly toward the peripheral wall 21 of the casing. Additional tape guiding posts 33, 34 and 35, which may be hollow, are disposed in the forward portion of the casing (FIG. 1) and spaced sufficiently from peripheral side wall 21 to provide tape-guiding slots with tape-guiding webs connected to the front peripheral wall 21 in a manner comparable to web 27 (FIG. 2). Posts 33 and 34 are respectively located at each of the two forward corners of casing 11.

Ledges 36 and 37 extend from the base of each post 33 and 34 respectively to support the tape T.

In the bottom wall 20 of the casing is provided a relatively large rectangular aperture 38 having a semi-circular indentation 39 in its forward edge, the aperture 38 being located abreast of and adjacent to aperture 24 in the peripheral side wall of the casing. A portion of the casing bottom wall 20, forming with the casing peripheral side wall 21 the aperture 24, is arcuately indented or concave at 40 for drive clearance purposes. Apertures 22, 23 and 24 are adapted to provide for frictional drive engagement of the tape at its opposite sides of web 27 by suitable frictional drive roller means (not shown) when the magazine is mounted in the recording and reproducing apparatus with which it is to be used.

The tape holding and tensioning member P (FIGS. 1 and 8) comprises a central hollow body portion 41 of slightly rhombic configuration in vertical section that has side wall portions 42, 43, of uniform thickness which slide freely on and are guided by the complementary-shaped sides of the guide lug 26 in a direction normal to portion 21*b* of the casing side wall. Extending outwardly from body portion 41 of tension member P are arms 44 and 45, one at each side thereof and appropriately reinforced at 47. The arms are of equal length with the end of arm 44 inclined toward wall section 21*a* and the end of arm 45 toward wall section 21*c*. Intermediate their lengths the arms 44, 45 have felt or similar friction pads 48 and 49 mounted thereon in facing relation to apertures 22 and 23, respectively.

A relatively weak compression spring 50 is interposed between abutment 30 and the tape tensioning member P and is held in position therebetween by engaging over suitable studs 51, 52 on members 30 and P, respectively. Spring 50 urges member P into engagement with the endless tape T (FIG. 1) whereby the felts 48, 49 effect a light frictional engagement with the transducer head components in apertures 22, 23 when the magazine is mounted in a recording and reproducing apparatus. Also, when the magazine is free of such apparatus, the spring 50 thrusts the ends of arms 44, 45 and the portions of the tape T in front of them into frictional engagement with sections 21*a* and 21*c* of casing side wall 21 to hold and maintain the open loop of the tape in position within the magazine regardless of the position in which it may be disposed.

The tape spool S (FIGS. 1 and 2) is rotatably mounted on hollow spindle 25 of the casing 11.

The spool S is composed of two component members 60 and 61. The component 60 comprises a flat circular disk or flange element having a central aperture 62 rotatably engageable with spindle 25. At two diametrically disposed locations are disposed upstanding latch prong-like members 63 and 64 integral therewith, the members 63 and 64 having latching projections 65 and 67, respectively, for a purpose to be presently described.

The other component member 61 of the spool S which forms the hub portion thereof, comprises a frusto-conical element 66 normally in contact with spool flange 60. It is of suitable thickness and the outer peripheral surface thereof is disposed obliquely radially outwardly with respect to disk 60 at an acute angle and thus forms an acutely inclined tape-receiving surface. The frusto-conical surface element 61 extends from its bottom wall portion that is parallel to and adapted to closely engage the adjacent side of disc 60. The opposite edge 68 of the frusto-conical member is flat and parallel to the bottom wall portion of the spool and of a height to lie approximately in the plane of the edge of the casing side wall 21. The bottom wall portion has a central up-standing hub 69 which registers with central aperture 62 of the spool member 60 and is rotatably received on spindle 25 of the casing.

Upstanding from bottom wall portion of spool member 61 are two radially and diametrically disposed latching lugs 68 and 69′. Over the ends of these lugs the respective projections of the latch prong-like members 63 and 64 of the spool flange or disk member 60 are adapted to spring outwardly and frictionally engage, to thereby latch the two spool component members 60, 61 together as a rigid unit when pressed together to form the tape spool structure S as a single unit.

When the composite tape spool S is positioned on spindle 25 in the casing, its upper edge lies substantially in the plane of the upper edge of casing peripheral wall 21 that is parallel to the bottom wall 20 (FIG. 3).

Noting FIGURE 1, the endless magnetizable tape T is spirally wound around the reel element 61 of the spool in a series of convolutions to form coil 70. Due to the sloping frusto-conical shape of reel element 66 the coil convolutions 70 are thereby caused to be laterally thrust or urged into close contact with the spool flange member 60 as the tape is fed onto the spool thus avoiding the necessity for an additional spool flange. The innermost coil of the tape feeds off from the spool at the point 71 to form the beginning of an open loop 72 that passes around tape guide abutments 32, 33, thence past the transducer head apertures 22, 23, drive aperture 24, abutments 35, 32′ and back to the spool to form the outermost convolution of coil 70.

The casing 11 has interiorly at each of its four corners an arcuate cover-aligning lug 80 that extends up from bottom wall 20 to a point appreciably above the upper edge of the peripheral side wall 21. The wall 21, except at its front wall, has at points throughout its length a plurality of spaced slightly inwardly extending triangular projections or lugs 81 that provide latching shoulders 82, as indicated in FIG. 2, for engagement with the cover latch elements hereinbefore referred to and which will now be more fully described.

Figure 6:
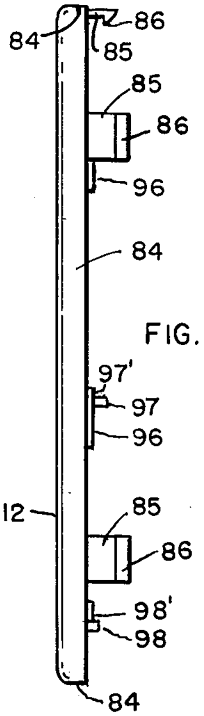
FIG. 6 is a side view of the cover member.
Figure 5:
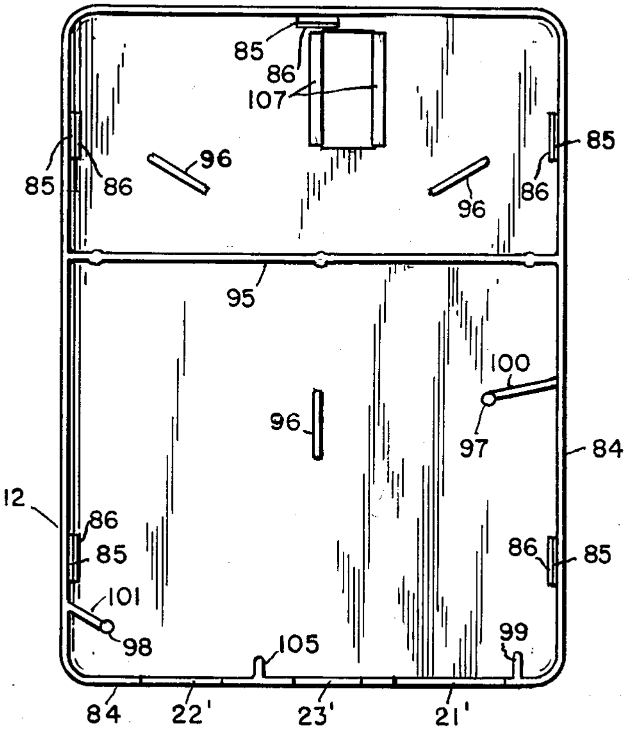
FIG. 5 is an inside plan view of the cover member.
Figure 4:
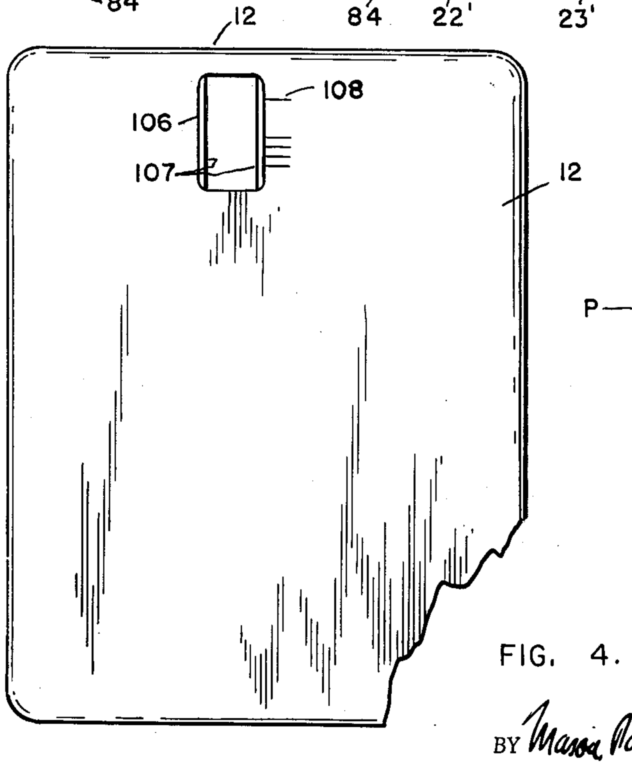
FIG. 4 is a plan view of the member cover.
Figure 7:
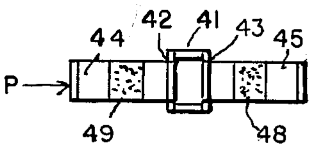
FIG. 7 is a front view of the tape holding tensioning member.

The cover 12 is complementary in shape and overall dimensions to the casing 11, though of lesser depth, its peripheral side wall 84 that is of uniform height and planar or flat between its arcuate corners being adapted to fit snugly and lightly against the upper straight edge of side wall 21 of the casing to seal against the admission of dirt and dust. Cover 12 has a number of integral and space partially resilient latch elements 85 each having an inclined latching shoulder 86, the latching elements extending integrally downwardly from, and parallel to, the inside surface of the peripheral wall 84 of the cover, noting FIGS. 5 and 6. The spaced cover latch elements correspond in number and spacing to latch lugs 81 of the casing 11, the latching shoulders 86 of the cover lugs 85 being adapted to spring over and latchingly engage shoulders 82 of the casing lugs to rigidly hold the cover on the casing in tightly closed and sealing relationship when the two magazine components 11, 12 are pressed together to form a unitary structure.

In order to enable the casing and cover members to be separated whenever desired after having been latched together in closed relationship, the casing bottom wall 20 has small apertures 91 disposed therein each in alignment with each of the latch structures through which a suitable tool may be inserted to slightly deflect the cover latch members 85 and effect their disengagement from the latching shoulders 82 of the casing. The release of the latching lugs permits the casing and cover members to be easily separated.

Extending transversely across the inner wall of the cover 12 and integral with its peripheral wall 84 is an integral web member 95. Web 95 not only reinforces and strengthens the cover 12, but also prevents the tape spool S from moving axially on its spindle 25 when the magazine is inverted or in other than an upright position.

To assure, under such conditions, that the tape convolutions 70 will also remain in spiral alignment, the cover has a plurality of relatively short radially extending web elements 96 extending downwardly from its inside cover wall that are of such depth and disposition as to extend proximate the edges of the coil convolutions 70 on spool S. In the embodiment illustrated three radial webs 96, disposed 120 degrees apart, are shown, though any desired number may be provided.

The cover has additional tape guiding means that coact with the various tape guiding means on the casing as previously described. These comprise guiding lugs 97, 98 and 99 that extend downwardly from the inside cover wall to a point below its peripheral wall 84, as shown, the lug 97 co-acting with lug 37 of the casing 11 in guiding the tape open loop 72 back onto spool S while lugs 98 and 99 aid in guiding the open loop between guide lugs 32 and 33 past casing apertures 22, 23 and 24. Webs 100 and 101 co-act with opposite webs of the casing to confine and maintain the tape in alignment with the coil convolutions 70 and centered in casing apertures 22, 23 and 24, portions of which are formed in wall 84 of the cover at 102, 103 and 104.

Lug 105 forms a stop abutment engageable by stop surface 41 of the tape tensioning member P to limit the outward movement of the latter under the action of its spring 50.

To provide for visual inspection of the coil convolutions, particularly when the structural material of the magazine cover and/or casing members is opaque, a window opening 106 is formed in the rearward portion of the cover that overlies the coil convolutions when the spool is disposed in the magazine. Appropriate support ledges 107 are provided on two or more opposite edges of the opening to provide adequate support for a transparent window (not shown) that is adapted to be fixedly mounted within the window opening.

Scale graduations 108 may be provided in the material of the casing cover 12 adjacent the side of the window opening 106 to indicate the particular size or numerical extent of the coil convolutions 70 of the particular tape that may be present in the magazine.

To mount a tape in the magazine the cover 12 is first removed from casing 11 by first deflecting one of the cover latch members 85 by means of screwdriver or similar tool inserted thereunder by means of the associated tool aperture 91 in the casing. The cover being thus released at that point is deflected away from the casing and the same process is repeated at one or more other latch members 85 which causes the cover 12 to spring free of the casing 11. Spool S with its endless transducer or other tape T prewound thereon at 70 in the manner indicated in FIG. 1, is placed on casing spindle 25. The tape open loop portion 72 is then threaded around guide lugs 32 and 33 past the felts 48 and 49 on tape tensioning member P, thence past aperture 24 and around guide lugs 34 and 35.

As previously stated, the ends of arms 44, 45 of the tensioning member P under the bias of spring 50 yieldingly thrust small segments of the tape against portions 21*a* and 21*c* of the casing peripheral wall 21 to tension the tape and also maintain the tape statically in the position indicated in FIG. 1 regardless of the position of the magazine when not in use.

The cover 12 is then re-mounted on casing 11 by aligning cover latch members 75 with the latch lugs 81 of the casing and then pressing the cover down into intimate contact to latch with the casing. The magazine is then ready for mounting in the magnetic or other type of recording and reproducing apparatus wherein the frictional drive roller of suitable construction engages the inner side of the tape T by extending through casing aperture 38. A capstan-mounted rubber or other type pinch roller (not shown) engages and bears frictionally against the opposite side of the tape, by protrusion through casing aperture 24 and the roller clearance 37 provided therein.

As the tape T is propelled around within the magazine by the drive means above referred to, it feeds onto the spool S at the left in FIG. 1 as the outer convolution of the tape coil while the innermost coil feeds off the spool in a slightly oblique manner at 71 from the righthand side as also indicated in FIG. 1. As the open loop 72 of the tape traverses the interior of the magazine it is propelled past the transducer head apertures 22 and 23 into which the transducer head components are adapted to be extended. Under these conditions the tape will be thrust inwardly against felts 48, 49 of the pressure member P which, by the bias of spring 50, maintains the tape in operative relationship with the transducer head.

It will be obvious to those skilled in the art that various changes in material and arrangement may be made in the invention without departing from the spirit and scope set out in the following claims.

What I claim is:

1. A magazine for an endless recording tape comprising a casing and a removable top therefor, said casing having a bottom and side walls, a perpendicular spindle integral with said bottom, a spool for an endless recording tape loosely journaled on the spindle, one of said side walls having a plurality of spaced apertures, a tensioning rib on said side wall between two adjacent apertures, a perpendicular guide lug on the casing bottom intermediate said two adjacent apertures, an abutment on the bottom in rear of the lug, a tensioning member slidable on the lug and overlying said apertures and the tensioning rib and a compression spring between said abutment and the tensioning member, another of said apertures being adapted to receive tape advancing means.

2. A magazine for an endless recording tape, comprising a casing and a removable cover therefor, said casing having a bottom and side walls, a perpendicular spindle integral with said bottom, a disk having a hub loosely journaled on the spindle, a spool for an endless recording tape removably carried by the disk, one of said side walls having a plurality of spaced apertures, a tensioning rib on said side wall between two adjacent apertures, a perpendicular guide lug on the casing bottom intermediate said adjacent apertures, said lug having a forwardly projecting tensioning rib opposite said first named rib, an abutment on the bottom in rear of the lug, a tension member slidable on the lug and overlying said apertures and the forwardly projecting tensioning rib and a compression spring between said abutment and the tensioning member, another of said apertures being adapted to receive tape advancing means.

3. A magazine for an endless recording tape, comprising a casing and a removable cover therefor, said casing having a bottom and side walls, a perpendicular spindle integral with said bottom, a disk loosely journaled on the spindle, an inverted frusto-conical spool removably carried by the disk for holding an endless recording tape, one of said side walls having a plurality of spaced apertures, a tensioning rib on said side wall between two adjacent apertures, a perpendicular guide lug on the casing bottom intermediate said two adjacent apertures, said lug having a forwardly projecting tensioning rib opposite said first named rib, an abutment on the bottom in rear of the lug, a tensioning member slidable on the lug, said member having a laterally extending arm on each side of the forwardly projecting tensioning rib overlying one of said apertures, and a compression spring between said abutment and the forwardly projecting rib.

References Cited in the file of this patent

UNITED STATES PATENTS

| | | |
|---|---|---|
| 2,768,244 | Tiger | Oct. 23, 1956 |
| 2,778,880 | Eash | Jan. 22, 1957 |
| 2,804,508 | Mastling et al. | Aug. 27, 1957 |
| 2,922,642 | Cousino | Jan. 26, 1960 |
| 2,988,954 | Kuhnert et al. | June 20, 1961 |
| 3,001,440 | Foster | Sept. 26, 1961 |

FOREIGN PATENTS

| | | |
|---|---|---|
| 1,178,828 | France | Dec. 15, 1958 |